United States Patent
Zhou

(10) Patent No.: US 8,407,496 B2
(45) Date of Patent: *Mar. 26, 2013

(54) COMPUTER SYSTEM WITH A HOST POWER SWITCH MOUNTED ON A MONITOR THEREOF

(75) Inventor: Hai-Qing Zhou, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 413 days.

This patent is subject to a terminal disclaimer.

(21) Appl. No.: 12/768,705

(22) Filed: Apr. 27, 2010

(65) Prior Publication Data

US 2011/0107125 A1    May 5, 2011

(30) Foreign Application Priority Data

Oct. 31, 2009  (CN) .......................... 2009 1 0309192

(51) Int. Cl.
*G06F 1/00* (2006.01)
*H05K 1/14* (2006.01)
(52) U.S. Cl. ......... 713/310; 713/300; 361/788; 361/803
(58) Field of Classification Search .................. 713/300, 713/310; 361/788, 803
See application file for complete search history.

(56) References Cited

U.S. PATENT DOCUMENTS

| 5,764,547 A * | 6/1998 | Bilich et al. ................... 713/321 |
| 6,125,449 A * | 9/2000 | Taylor et al. ................... 713/310 |
| 8,154,882 B2 * | 4/2012 | Liu ............................... 361/803 |
| 2005/0114716 A1 * | 5/2005 | O ................................. 713/300 |
| 2008/0162950 A1 * | 7/2008 | Brown et al. ................. 713/300 |
| 2009/0125733 A1 * | 5/2009 | Lin et al. ....................... 713/310 |
| 2009/0307382 A1 * | 12/2009 | Chan et al. ..................... 710/16 |

FOREIGN PATENT DOCUMENTS

CN        2715213 Y    8/2005

* cited by examiner

*Primary Examiner* — Vincent Tran
(74) *Attorney, Agent, or Firm* — Altis Law Group, Inc.

(57) ABSTRACT

A computer system includes a monitor, and a motherboard. The monitor includes a display screen, a switch set on the monitor, and a first video connector. The first video connector includes a first monitor identity pin, and a first ground pin. The motherboard includes a second video connector. The second video connector includes a second monitor identity pin electrically connected to the first monitor identity pin, and a second ground pin electrically connected to the first ground pin. The second monitor identity pin and the second ground pin are correspondingly connected to a power signal line and a ground line of the motherboard. The switch is connected between the first monitor identity pin and the first ground pin, to control the motherboard to power on or power off.

4 Claims, 2 Drawing Sheets

COMPUTER SYSTEM WITH A HOST POWER SWITCH MOUNTED ON A MONITOR THEREOF

BACKGROUND

1. Technical Field

The present disclosure relates to a computer system.

2. Description of Related Art

Nowadays, computers are widely used by people for both research and communications. A user must press a power button to power on or off the computer system. However, when the host computer is placed beyond a certain distance from a user, the powering on or off can be inconvenient.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
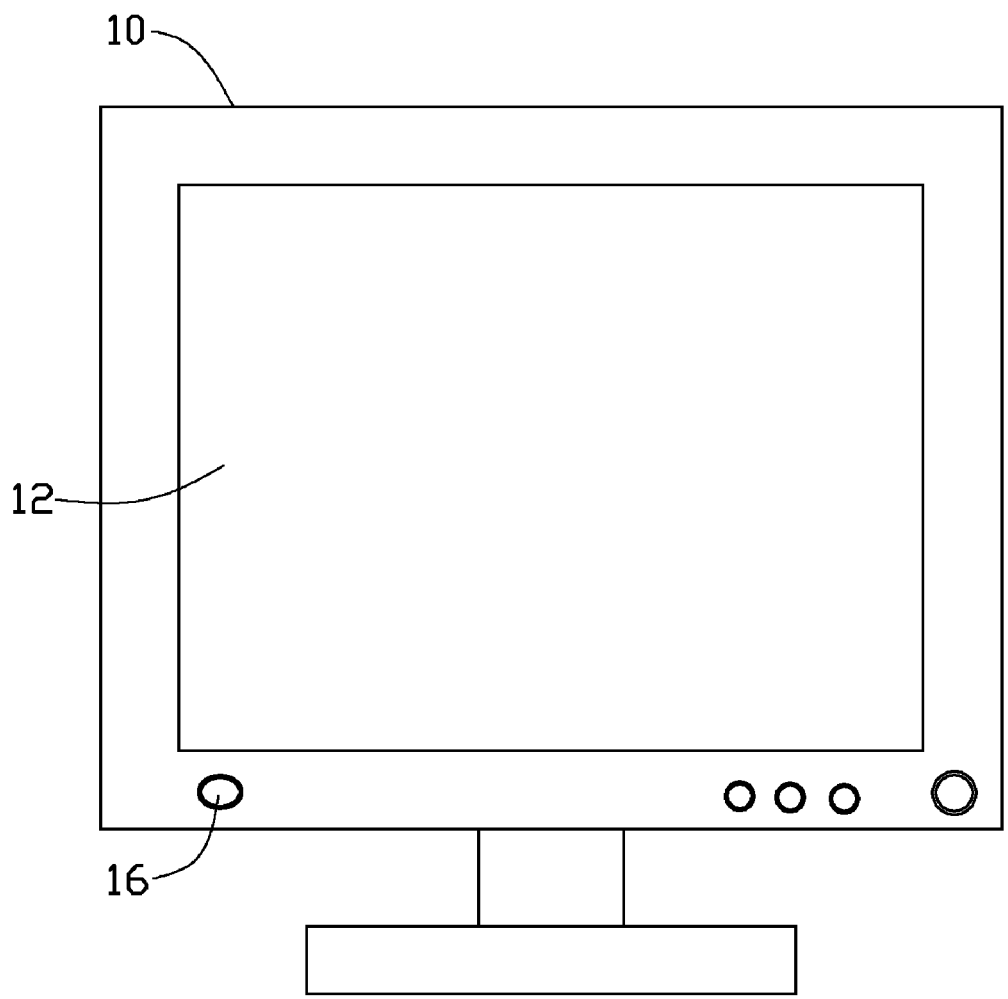
FIG. 1 is schematic diagram of an exemplary embodiment of a monitor of a computer system.
Figure 2:
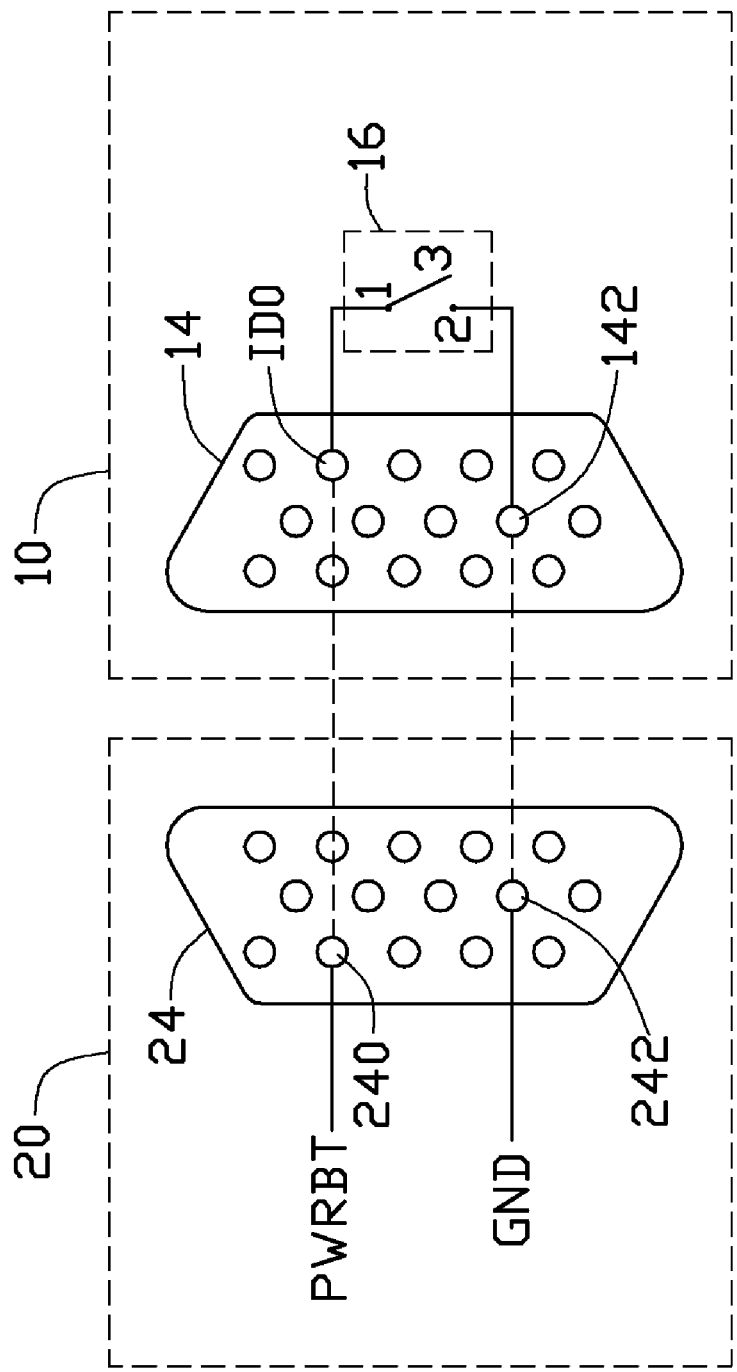
FIG. 2 is a circuit diagram of an exemplary embodiment of a motherboard and the monitor of the computer system of FIG. 1.

Referring to FIGS. 1 and 2, an exemplary embodiment of a computer system includes a monitor 10 and a host computer (not shown). The host computer includes a motherboard 20.

The monitor 10 includes a display screen 12, a video connector 14, and a switch 16. The video connector 14 is a video graphics array (VGA) connector, and includes a monitor identity pin ID0, and a ground pin 142. The switch 16 includes a first throw 1, a second throw 2, and a pole 3. The first throw 1 is connected to the monitor identity pin ID0. The second throw 2 is connected to the ground pin 142. The pole 3 is set on an outside surface (not labeled) of the monitor 10, at a side of the display screen 12.

The motherboard 20 includes a video connector 24. The video connector 24 includes a monitor identity pin 240 corresponding to the monitor identity pin ID0 of the monitor 10, and a ground pin 242 corresponding to the ground pin 142 of the monitor 10. The monitor identity pin 240 is connected to a power signal line PWRBT of the motherboard 20. The ground pin 242 is connected to a ground line GND of the motherboard 20.

The video connector 14 is electrically connected to the video connector 24 via a VGA cable. The monitor identity pin ID0 is connected to the monitor identity pin 240. The ground pin 142 is connected to the ground pin 242. If the motherboard 20 is in a power off state, when the pole 3 of the switch 16 is pressed, the power signal line PWRBT of the motherboard 20 connected to the ground line GND of the motherboard 20 is at low level, the host computer powers on. If the motherboard 20 is in a power on state, when the pole 3 of the switch 16 is pressed, the power signal line PWRBT of the motherboard 20 connected to the ground line GND of the motherboard 20 is at a low level, the host computer is powered off. The switch 16 can function as a power switch of the host computer. In order to prevent a user from accidentally pressing the switch 16, the switch 16 can be designed to power on the host computer by being pressed for a predetermined time period. The predetermined time period is set in the basic input output system (BIOS).

In other embodiments, the video connectors 14 and 24 can be other types of connectors, as long as each of the video connectors 14 and 24 includes a monitor identity pin ID0 and at least one ground pin.

The computer system controls input signals of the power signal line PWR of the motherboard 20 via the switch 16 of the monitor 10, to further control the motherboard 20 to power on or power off. Therefore, the computer system can be operated conveniently.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A computer system comprising:
   a monitor comprising:
     a switch set on an outside surface of the monitor; and
     a first video connector comprising a first monitor identity pin and a first ground pin; and
   a motherboard comprising:
     a power signal line;
     a ground line; and
     a second video connector comprising a second monitor identity pin electrically connected to the first monitor identity pin and the power signal line, and a second ground pin electrically connected to the first ground pin and the ground line;
   wherein the switch is connected between the first monitor identity pin and the first ground pin, to control the in motherboard to power on or power off.

2. The computer system of claim 1, wherein the first video connector and the second video connector are video graphics array connectors.

3. The computer system of claim 1, wherein the switch comprises a first throw connected to the first monitor identity pin, a second throw connected to the first ground pin, and a pole set on an outside surface of the monitor.

4. The computer system of claim 3, wherein the monitor further comprises a display screen, the pole is set at a side of the display screen.

* * * * *